Feb. 24, 1959 R. W. SCARBOROUGH ET AL 2,874,537
TURBOJET ENGINE ARRANGEMENT UTILIZING EVAPORATIVE COOLING
Filed Jan. 7, 1955

INVENTORS
ROBERT W. SCARBOROUGH
WOLDEMAR VOIGT
BY
ATTORNEY

2,874,537
TURBOJET ENGINE ARRANGEMENT UTILIZING EVAPORATIVE COOLING

Robert W. Scarborough and Woldemar Voigt, Baltimore County, Md., assignors to The Martin Company, a corporation of Maryland Application January 7, 1955, Serial No. 480,391

5 Claims. (Cl. 60—35.6)

This invention relates to air-breathing reaction motors and their operation and has particular reference to the augmentation of the properties and performance of a given reaction motor without requiring severe changes in design or in the materials used in its construction.

Air-breathing reaction motors, more frequently termed "jet engines," are most commonly used to power aircraft and self-propelled missiles and, like all machinery, are built to certain design specifications and have resulting limiting values of thrust, and speed which they are ordinarily capable of reaching. In the case of thrust, of course, the limiting value is essentially a matter of design, including engine size, but if a size limitation is also imposed for other reasons, then a practical thrust ceiling appears. In the case of speed, temperature factors enter into the consideration, and speed ceilings are reached beyond which the allowable temperatures for the operation of the engine concerned would be exceeded.

Efforts are, of course, continually being made to augment the properties of current jet engines in all respects, especially without severe structural changes, and without serious penalties in other directions such as overall aircraft weight and the like. One current effort is readily recognized in the form of the usual turbojet afterburner by which the burning of additional fuel at a location near the engine's exhaust increases the amount of thrust obtainable using an engine of a particular basic design. Another direction which such efforts at performance improvement have taken is the introduction of water into the engine to increase the amount of fuel which can be burned without overheating critical engine parts (such as parts of the turbine) and thus to increase the thrust. By this means it has been found possible to increase the thrust of a given jet engine somewhere in the neighborhood of 20%, under static sea level conditions, but these increases are as low at 1% to 2% when conventional water injection techniques are employed during high speed, high altitude flight. To achieve these results has commonly required the induction into the engine of sufficient water to raise the relative humidity of the air to very nearly 100% and hence entails the use of large quantities of water which are objectionable from the standpoint of added weight, especially in aircraft.

The present invention has for its object the provision of a new technique whereby the speed ceiling of any particular jet engine can be significantly raised, an effect not heretofore believed to be possible short of redesign of engine parts exposed to high temperatures as a result of speed.

Another object of the invention is the provision of increased thrust and altitude ceilings for a given jet engine, which accompany the increase in speed ceiling achieved according to the immediately foregoing object.

Still another object of the invention is the improvement of jet engine speed performance by cooling of the intake air.

A further object of this invention is to provide a particular means and method for cooling the intake air without paying a severe weight penalty for this improvement.

An additional object of the invention is to provide means for cooling the intake air of a jet engine by introducing an evaporant liquid into the engine air current upstream of the compressor section by a distance sufficient to allow substantially complete evaporation of the liquid by the time it reaches the compressor section to reduce the air temperature at the compressor intake below that which it would normally have for a given set of ambient conditions.

A still further object of the invention is the significant augmentation of the properties of a jet engine while still adding only a small amount of evaporant liquid to produce a small rise in relative humidity, whereby extensive improvement in operation can be obtained with only minor additions of weight.

The invention has for an additional object the provision of a method for augmenting jet engine performance which includes the step of cooling the air prior to its introduction into the compressor section or upstream end of the engine.

A still further object of the invention is the provision of a method for augmenting jet engine performance by introducing a small amount of an evaporant liquid into the air current upstream from the compressor section of the engine a distance sufficient to allow substantially complete vaporization by the liquid by the time it reaches the compressor.

Additional objects, features and advantages of the invention will appear hereinafter as the description proceeds.

A preferred embodiment of the invention is illustrated in the accompanying drawing, wherein.

Figure 1:
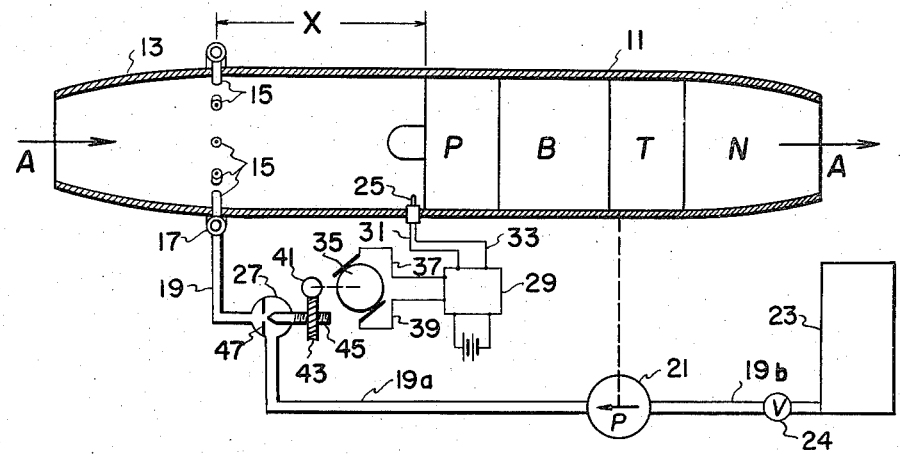
Figure 1 is a diagrammatic section of the device of the present invention showing a jet engine and the means for providing evaporant liquid to the intake air.

With reference to Figure 1 of the drawing, the invention is shown as related to an air-breathing reaction motor or jet engine 11. For convenience and simplicity the engine is shown as including a compressor section P, a combustion section B, a turbine T and nozzle N, all indicated diagrammatically. As will be readily understood, when the engine is in operation, an air current, indicated by arrows A, enters the compressor P and flows through the engine to be first compressed, then heated, to drive the turbine T, and then to be exhausted through nozzle N to produce thrust.

The present invention is designed to bring about a significant improvement in the performance of jet engine 11 by causing a cooling of the air which reaches the intake of the compressor section P. While various methods and devices, such as a cooling turbine, can be employed to this end, the device which has been found most expedient and which is illustrated in the accompanying drawing includes means providing a duct 13 of significant length leading into the compressor section P of the engine 11. A plurality of spray nozzles 15 are mounted in the duct to discharge inwardly thereof and are preferably so arranged as to give a fairly uniform concentration of mist over the whole throat of the duct. The spray nozzles 15 are shown as connected to a header ring 17 which supplies them and which is in turn connected by a pipe 19, 19a with a pump 21 which supplies an evaporant liquid from a storage tank 23 via a pipe 19b which can be controlled, if desired, by a suitable valve 24. The pump 21 may be conveniently driven from the shaft of turbine T in a well-known manner. The fluid is moved from tank 23 by pump 21 which causes the liquid to be forced through the spray nozzles 15, thus forming a mist in the duct 13. This mist evaporates and takes up sufficient heat to cool the air current A by a significant amount, roughly proportional to the amount of evaporant injected.

For safe operation, the temperature of the air at the intake to compressor P must not exceed a predetermined value for a given jet engine, and for this reason it is herein proposed to control the temperature at this location by regulating the amount of evaporant liquid injected. The means shown in the drawing for this purpose includes a temperature sensing device 25 (which may be for example a thermocouple), a flow adjusting valve 27 in the pipe 19, and means whereby the former may control the setting of the latter and hence the amount of evaporant injected into the air current A.

One form of connection means is illustrated diagrammatically and consists of an amplifier 29 connected to the thermocouple by conductors 31, 33 and to an electric motor 35 by conducotrs 37, 39. The motor 35 is shown driving a worm 41 which meshes with a worm wheel 43 threadedly engaged with the stem of a needle 45 which may thus be moved towards or away from a seat 47 forming a part of the valve 27. Thus the current generated at sensing device 25 causes the needle 45 to be adjusted relative to its seat 47 to provide an evaporant flow which corresponds to a desired air current temperature at the inlet to compressor P.

The evaporant liquid may be any suitable material, but should have a convenient boiling temperature well below the air current temperatures experienced and a high latent heat of vaporization. At the present time, water is preferred for this purpose. However, it is also clear that, within the scope of the invention, other materials may be substituted, and when water is employed, it may be mixed with other liquids, e. g., alcohol, to impart additional properties such as depression of the freezing point.

The cooling of the air current A comes about as a result of the evaporation of the liquid while the current is travelling towards the intake of compressor P. In order to achieve the object of having the air suitably cooled, then, it is found necessary to have the spray nozzles 15 placed at a significant distance X upstream from the compressor intake. The distance X will, of course, vary with such factors as the engine design, the size of droplets generated by the nozzles 15 and the like, and will be readily determined empirically for any particular case. As an indication of an appropriate value for X it has been found that a distance of at least four feet was necessary in one instance relating to an axial flow turbojet that was being considered. This value can vary substantially, and need only be set so that the droplets of liquid are substantially completely vaporized by the time the compressor intake is reached.

Figure 2:
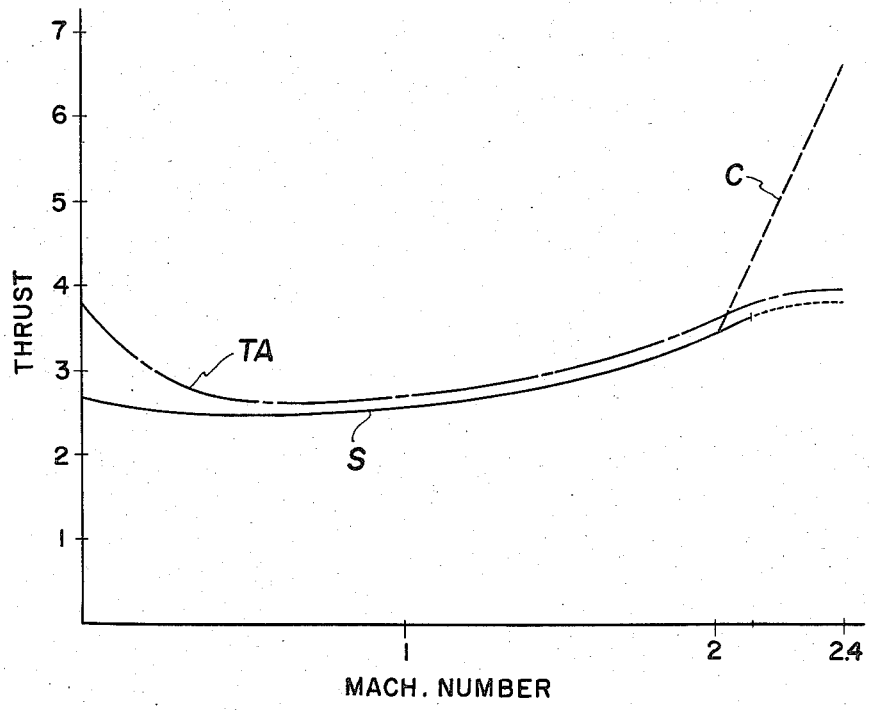
Figure 2 is a chart illustrating the manner in which the method and apparatus of the present invention take effect, and the results achieved as compared with results obtained with prior usages for a selected exemplary situation.

In order to bring out the nature and significance of the present invention, we may consider for comparison an expedient heretofore employed for the augmentation of thrust, namely, water injection. This comparison is best brought out by a chart and for this purpose Figure 2 is introduced. While it is not attempted to reproduce exact values of thrust and the curve may suffer some distortion in this respect, the principle of speed increase as opposed to thrust augmentation is clearly shown. To the extent that the chart of Figure 2 is relied on for this purpose, then, it may be regarded as an accurate, if somewhat simplified, representation. In applying the known water injection method of thrust augmentation, water was introduced at the compressor or combustion chamber in amounts sufficient to raise the relative humidity substantially, usually to about 100%. This provided cooling at the combustion chamber and turbine sufficient to allow burning substantial additional fuel without overheating and with consequent increased thrust.

In Figure 2, the solid line S represents the standard condition for a given jet engine, with thrust as the ordinate and Mach number as the abscissa. It is to be noted that standard curve S terminates approximately Mach 2.1, which indicates the approximate normal temperature limit of a jet engine under such speed conditions. More specifically, when an aircraft is flying at such high speeds, the inlet temperatures normally occurring at the engine face are so substantial as to endanger critical parts of the engine. Also to be noted on this figure is dash-dot line TA, which represents approximately the thrust obtainable by a jet engine utilizing conventional water injection techniques. Although thrust outputs substantially larger than normal thrust can be obtained at low speeds by the use of water injection, nevertheless this increase in thrust over the standard or normal engine performance diminishes rapidly with increase in Mach number. As will be apparent from this figure, the increase in thrust that can be obtained using ordinary water injection techniques is quite small at higher speeds, and therefore it it not practical under such circumstances.

Dashed line C in Figure 2 represents the performance to be obtained utilizing evaporative cooling according to this invention. This curve slopes steeply upward from a point on standard line S located approximately at Mach Number 2, and extends up to approximately Mach Number 2.4. As should be apparent from this latter curve, a strikingly large increase in thrust over the standard engine performance is obtained by the instant evaporative cooling arrangement. Thus, by evaporatively cooling the intake air, we have found it possible to extend the performance of an engine from a limiting speed of approximately Mach 2.1 up to a speed of approximately Mach 2.4 or higher.

An important feature of the present invention can be seen if a comparison is drawn between the requirements for increasing thrust by water injection and for similarly increasing it indirectly due to the speed increase brought about by cooling of the intake air. With the specific form of cooling described and in connection with one particular turbojet engine with after-burner, it is possible to gain this thrust increment at a cost of only 2.65 pounds per hour of water consumption for each additional pound of thrust. This means that we are required to raise the relative humidity by very small amounts, for example in the neighborhood of 1% to 5%, which corresponds to roughly 40% saturation. Further, the water feed system can be of small capacity throughout and designed to carry quite minor liquid flow. In similar engine equipment under similar conditions, but using the water injection technique for thrust augmentation, the additional thrust is gained at a cost of about ten pounds per hour of water consumed for each pound of thrust gained. Thus, in aircraft use, the employment of the intake air cooling technique of this invention provides a revolutionary contribution in the direction of weight reduction for high thrust requirement situations, and increases markedly the altitude ceiling of the aircraft in addition to the speed increase heretofore mentioned.

It will be appreciated that while the principles of the present invention have been described largely without reference to the presence or absence of other measures, it may be employed in concert with other performance augmenting techniques such as afterburners and water injection without interfering with its principle of operation or effectiveness.

While the description herein has proceeded on the basis of the use of the invention in connection with a turbojet engine, it will be appreciated that other applications exist and that, for example, the performance of engines of the ram jet type may be similarly controlled and improved.

Although the foregoing description proceeds largely on the basis of improving properties of existing engines, it will be appreciated that the improvements described herein may be embodied in the design of future engines, and the advantages to be achieved under such circumstances are included within the scope of the invention herein claimed.

While, in order to comply with the statute, the invention is described in language which is rather specific as to structural features and arrangements, it is to be understood that the invention is not limited to the specific details shown, but that the means herein disclosed comprises the preferred of several modes of putting the invention into effect, and the invention is therefore claimed in any of its forms or modifications within the scope of the language employed in the appended claims.

What we claim and desire to secure by Letters Patent is:

1. An air breathing reaction engine arrangement utilizing evaporative cooling, and operable at a speed of at least Mach Number 2, comprising an air-breathing engine, and an inlet duct extending upstream from the inlet of said engine, through which duct ram air is admitted to said engine, said duct containing at least one spray nozzle located at least four feet upstream of said engine inlet for dispersing evaporant liquid into said duct so that said liquid will be virtually completely evaporated in said duct before reaching said engine inlet as a result of the aerodynamic heating of the air and the substantial travel distance in said duct, and means for controlling the rate of injection of said liquid into said duct proportionally to the amount of heat which must be removed from the inlet air to lower its temperature to the maximum temperature limit of the engine, whereby cooled air of increased density enters said engine permitting substantial quantities of additional fuel to be combusted therein without exceeding the temperature limits of the engine, and resulting in a substantial increase of the highest permissible flight speed for said engine and in approximately 50% increase in thrust over the normal thrust of the engine.

2. The air-breathing reaction engine arrangement as defined in claim 1 in which said apparatus includes a tank for supplying evaporant liquid, a metering valve for controlling the flow from said tank into said duct, a temperature sensing device adjacent the intake of said compressor section, and means for adjusting the setting of said metering valve in accordance with the temperature sensed by said sensing device.

3. The method of operating a turbojet engine at a speed exceeding both Mach Number 2 and the highest speed to which the operation of the engine normally would be limited by ram temperature, comprising the steps of measuring the ram temperature at the engine inlet, spraying a quantity of evaporant liquid into the inlet air a considerable distance upstream of the engine inlet so that the liquid will be virtually completely evaporated before reaching the engine, and controlling the amount of evaporant liquid injected in accordance with the measured ram temperature at the engine inlet in such a way that the ram temperature will be held close to, but below the highest ram temperature at which the engine is normally permitted to operate, thereby resulting in a substantial increase of the highest permissible flight speed for said engine, and in approximately 50% increase in thrust over the normal thrust of the engine.

4. The method of utilizing evaporative cooling in a turbojet engine operating at a speed of at least Mach Number 2, said engine having a duct extending upstream from the compressor of the engine through which duct ram air can enter the compressor inlet, comprising the steps of injecting liquid into said duct so as to substantially cool the ram air by virtually complete evaporation of liquid in the duct a considerable distance upstream of the compressor inlet, and increasing substantially the flow of fuel to the combustors of the engine while maintaining the engine within safe inlet temperature limits, resulting in substantial increase of highest permissible flight speed for said engine, and in approximately 50% increase in thrust over the normal thrust of the engine.

5. A turbojet engine arrangement utilizing evaporating cooling and operable at a speed exceeding both Mach No. 2 and the highest speed to which the operation of the engine normally would be limited by ram temperature, comprising an engine having an air inlet duct extending upstream for a substantial distance forward of the inlet of said engine, injection apparatus in said inlet duct at least 4 feet forward of said engine inlet for injecting evaporant liquid into the ram air flowing in said duct so that as a result of aerodynamic heating, said liquid will be evaporated before reaching said engine inlet, means including a temperature sensing element for sensing the air temperature at the engine inlet, and means for controlling the rate of injection of said liquid into said air inlet duct in response to temperature in such a manner as to substantially cool said engine inlet air over a wide range of free stream air temperatures, and maintain the inlet air slightly below the maximum inlet air temperature to which the engine is limited.

References Cited in the file of this patent

UNITED STATES PATENTS

| | | |
|---|---|---|
| 2,549,819 | Kane | Apr. 24, 1951 |
| 2,674,843 | Lombard | Aug. 13, 1954 |
| 2,686,631 | Jordan | Aug. 17, 1954 |

FOREIGN PATENTS

| | | |
|---|---|---|
| 151,350 | Australia | May 11, 1953 |

OTHER REFERENCES

"Jet Propulsion Turbojets" by Volney C. Finch, published, 1958, by The National Press of Millbrae, California, pages 296 to 299.

"Jet Aircraft Power Systems" by Jack V. Casamassa, published, 1950, by McGraw-Hill Book Co. Inc., of New York, pages 138 to 141.